Figure 1:
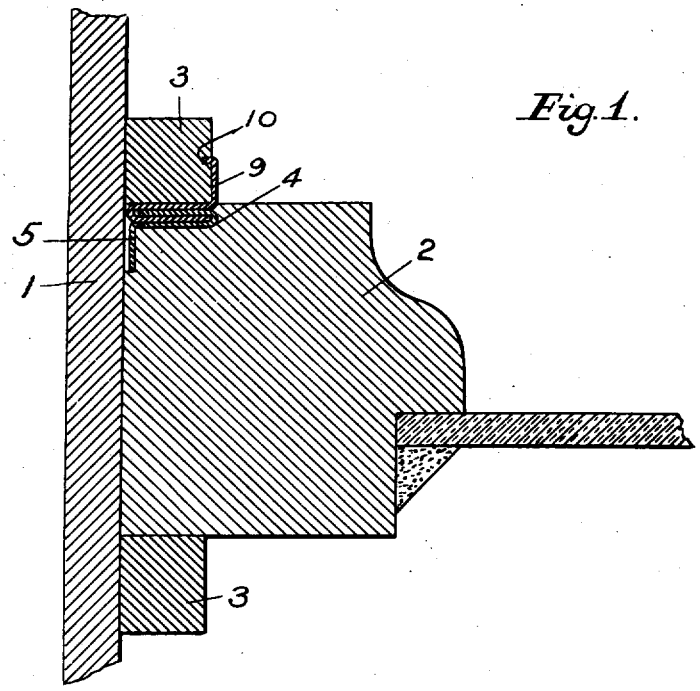

Dec. 24, 1929. A. J. SPANJERS ET AL Re. 17,539

WEATHER STRIP

Original Filed March 12, 1926

INVENTOR
ARNOLD J. SPANJERS
BY ANTON R.P. SPANJERS
Andrew E. Barker
ATTORNEY

Reissued Dec. 24, 1929

Re. 17,539

UNITED STATES PATENT OFFICE

ARNOLD J. SPANJERS, OF DULUTH, AND ANTON R. P. SPANJERS, OF MINNEAPOLIS, MINNESOTA

WEATHER STRIP

Original No. 1,648,787, dated November 8, 1927, Serial No. 94,170, filed March 12, 1926. Application for reissue filed October 14, 1929. Serial No. 399,674.

This invention relates to weather strips and has particular reference to a metal weather strip for application to windows.

The principal object of the invention is to provide such a weather strip which will be comparatively simple and inexpensive to manufacture, highly efficient and durable in use, and easily installed.

Other objects and advantages of the invention will appear in the further description thereof.

Figure 2:
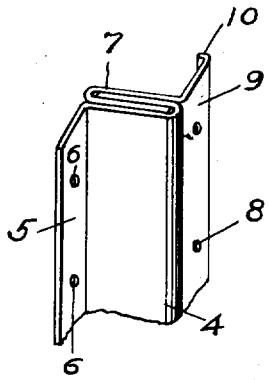

Referring to the accompanying drawing forming part of this application, and wherein like reference characters indicate like parts:

Fig. 1 is a partial horizontal section through a window sash, its parting stops, and frame: and Fig. 2 is a perspective view of a portion of the weather strip, showing the cooperative relation of the two parts.

In the drawings 1 represents the window frame against which the window sash 2 is vertically reciprocable, upon either side of which and fixed to the frame 1 are the parting strips or stops 3.

The weather strip comprises two interlocking reciprocable portions, one of which is fixed to the parting stop and the other to the window sash. That part which is attached to the window sash comprises a U-shaped portion 4 formed by the metal being bent upon itself and the sides formed thereby being spaced apart in parallel relation just the thickness of the metal, and then one of the sides being bent at right angles forming a flange 5 in which are formed holes 6. As indicated in Fig. 1 the corner of the sash to which this portion of the strip is attached is formed with an L-shaped recess which is cut out just sufficiently to accommodate the same, and the strip is secured to the sash by nails or other means passing through the holes 6 into the sash as is common. The other cooperative portion of the strip is almost identical in shape with the sash portion and comprises the U-shaped member 7 formed of the metal being bent upon itself forming parallel sides spaced just the thickness of the metal apart, and one side being bent at right angles forming a flange 9 in which are punched or drilled holes 8 through which are placed the fastening means for holding this flange to the stop 3. The extreme end of the flange 9 is bent at right angles again as at 10, this portion being parallel to the member 7 and which is driven into the stop 3 when applied thereto. As clearly seen in Fig. 2 the straight sides of the members 4 and 7 reciprocate within each other when installed, forming a very effective means for excluding or preventing the elements from entering between the window and its frame.

The device here illustrated is that which is installable intermediate of the sash and frame therefor, and it is obvious that an installation embodying the same interlocking U-shaped feature may be provided for the top and bottom of the window frame, without departing from the spirit of the following claims.

Having thus described our invention what we claim and desire to secure by Letters Patent is:

1. The combination with a slidable window sash and stop therefor, of an L-shaped recess formed wholly about the corner of the window sash adjacent the stop, and two cooperatively engaged U-shaped metal strips installed within said recess, each strip having a right angularly disposed flange one for fixed engagement about the corner of the stop and the other for fixed engagement about the corner of the sash.

2. The combination with a window frame including a stop and a sash slidable adjacent thereto, of an L-shaped recess formed wholly about the corner of the sash adjacent the stop, and two cooperatively engaged U-shaped metal strips installed within said recess, one of said strips having a flange for securing engagement with the frame, and the other of said strips having a right angularly disposed flange for fixed engagement about the said corner of the sash.

3. The combination with a window frame having a stop and a sash slidable in the frame adjacent the stop, of a pair of metal strips having interslidably associated U-shaped portions one of which strips is carried by the frame, the other of said strips being provided with a right angularly disposed flange, the sash being provided about the corner thereof adjacent the stop with an L-shaped recess in which the second mentioned strip is secured.

Signed at Minneapolis, Minnesota, this 12th day of October 1929.

ARNOLD J. SPANJERS.
ANTON R. P. SPANJERS.